United States Patent
Tsai

(10) Patent No.: US 11,966,506 B1
(45) Date of Patent: Apr. 23, 2024

(54) REAL-TIME HOLOGRAPHIC REALITY DISPLAY SYSTEM

(71) Applicant: UNICORNVR ENTERTAINMENT CO., LTD., New Taipei (TW)

(72) Inventor: Yao-Yu Tsai, New Taipei (TW)

(73) Assignee: UNICORNVR ENTERTAINMENT CO., LTD., New Taipei (TW)

(*) Notice: Subject to any disclaimer, the term of this patent is extended or adjusted under 35 U.S.C. 154(b) by 0 days.

(21) Appl. No.: 18/322,090

(22) Filed: May 23, 2023

(51) Int. Cl.
*G06F 3/01* (2006.01)
*B25J 9/16* (2006.01)
*G02B 30/56* (2020.01)
*G06T 13/40* (2011.01)
*G09F 19/12* (2006.01)
*G09G 3/00* (2006.01)

(52) U.S. Cl.
CPC ............. *G06F 3/011* (2013.01); *B25J 9/1697* (2013.01); *G02B 30/56* (2020.01); *G06T 13/40* (2013.01); *G09F 19/12* (2013.01); *G09G 3/003* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 6,433,761 B1* | 8/2002 | Remitz | G09G 3/005 340/815.87 |
| 10,109,224 B1* | 10/2018 | Ratti | B64C 39/024 |
| 10,410,559 B2* | 9/2019 | Meng | G09G 3/14 |
| 2004/0102223 A1* | 5/2004 | Lo | G09G 3/005 455/566 |
| 2019/0228690 A1* | 7/2019 | Meng | G09G 3/14 |

* cited by examiner

*Primary Examiner* — Matthew Yeung

(57) ABSTRACT

The present invention relates to a real-time holographic reality display system with an automatic motion capture device which synchronizes real-time motion coordinate data of a performer to a virtual 3D character in a computer device for transmission of image data to a realistic holographic reality display unit for synchronous performance. In the present invention, data is transmitted to a virtual character in a computer device from a motion capture device worn on a performer for completion of real-time image formation and transmission of image data to the holographic reality display unit, which consists of a robotic arm, a mounting bracket and a hologram LED fan display for effectuation of real-time holographic reality display.

7 Claims, 2 Drawing Sheets

REAL-TIME HOLOGRAPHIC REALITY DISPLAY SYSTEM

BACKGROUND OF THE INVENTION

1. Field of the Invention

The present invention relates to the field of holographic projection through which a virtual character is displayed in the realistic world and images of the virtual character's vivid performance in the realistic world are watched by plays' naked eyes.

2. Description of the Prior Art

The holographic projection is one technique with which the whole three-dimensional pictures of a virtual character or an object are displayed in realistic space and watched by an observer's naked eyes.

For display of three-dimensional pictures of a virtual character in realistic space, a virtual character will be rendered on a large-scale stage only by the holographic projection based on gauze screens amid traditional holographic projection techniques. However, traditional techniques are criticized for the following drawbacks:

1. Light pollution: A traditional technique provided with a projector for image projections is available in a very dark environment despite high lumen conditions;
2. Images displayed on a plane: A traditional technique which relies on a translucent planar gauze screen for display of images on a plane without totally free movement is short of reality of images;
3. High setup cost: The cost is significantly high because of large-sized gauze screens for the holographic projection technique, which are erected on a large-scale stage and impose restrictions on a venue of performers, and applications of high-lumen projectors.

SUMMARY OF THE INVENTION

In virtue of the above issue, the present invention is aimed at providing a real-time holographic reality display system, which is characteristic of a low-latency robotic arm combined with the low-latency-motion data synchronization technique and is integrated with free-light-pollution LED fans and a motion capture system, such that a virtual character's realistic and agile motions are displayed to the whole world for the first time and applicable to large-scale public performances such as cheerleading squad and stage show.

To this end, a real-time holographic reality display system in the present disclosure comprises: a display unit equipped with a robotic arm and a hologram LED fan display wherein the robotic arm is capable of lifting the hologram LED fan display for motions and the hologram LED fan display shows images of a virtual character; a motion capture device installed on a performer and used in capturing real-time body motion coordinate data of the performer; a computer device used in receiving the real-time body motion coordinate data transmitted from the motion capture device for calculations of a virtual character's skeleton coordinate data that are further divided into (a) position data to be transmitted to the robotic arm and (b) motion data to be transmitted to the hologram LED fan display on which the body motions of the performer are displayed through the virtual character immediately.

The real-time holographic reality display system in the present disclosure features the following advantages compared with a traditional holographic projection technique based on gauze screens or other holographic projection techniques:

1. No adverse effect of light pollution: Hologram LED fans are applicable to a luminous performance venue for proper display during daytime or normal illumination;
2. Multi-axle motion: The six-axle robotic arm effectuates totally six low-latency axial motions including three-way movement (i.e. X, Y and Z axles) and three-rotation freedom (i.e. X, Y and Z axles).
3. Low setup cost: One set of robotic arm without extra projectors or stage construction is required; other sliding rails are easily installed for expansion of activity space and better cost effectiveness on a large-scale stage.

DETAILED DESCRIPTION OF THE PREFERRED EMBODIMENT

Figure 1:
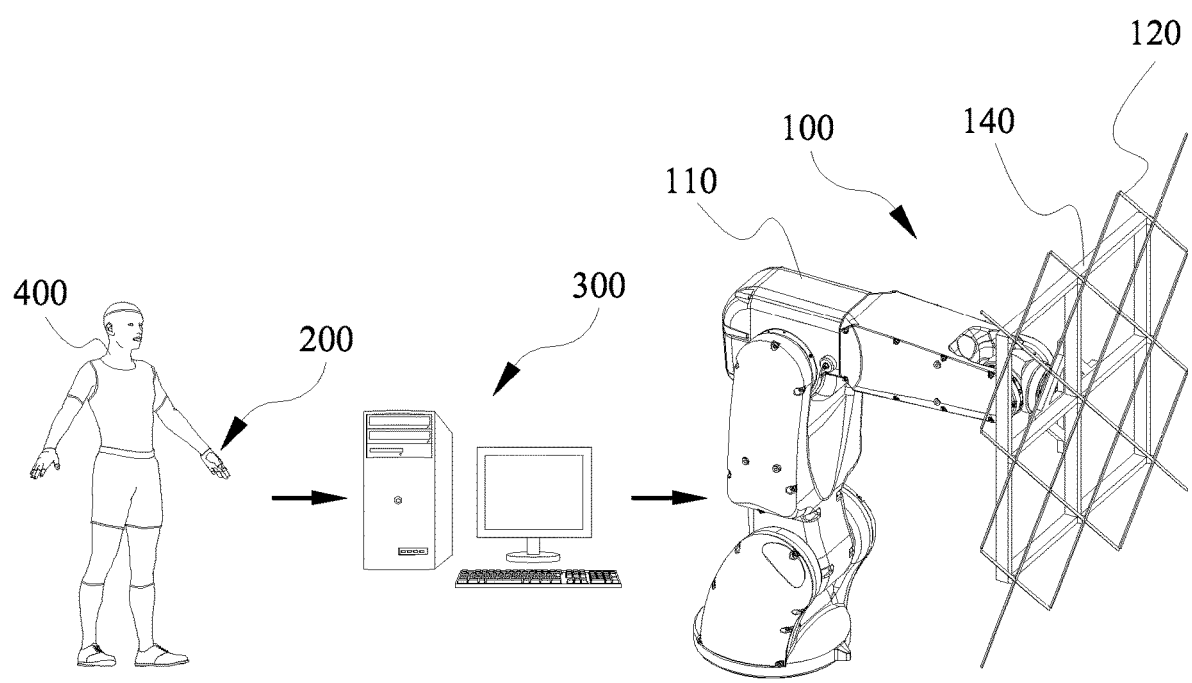
FIG. 1 is a schematic view for overall architecture of a real-time holographic reality display system.
Figure 2:
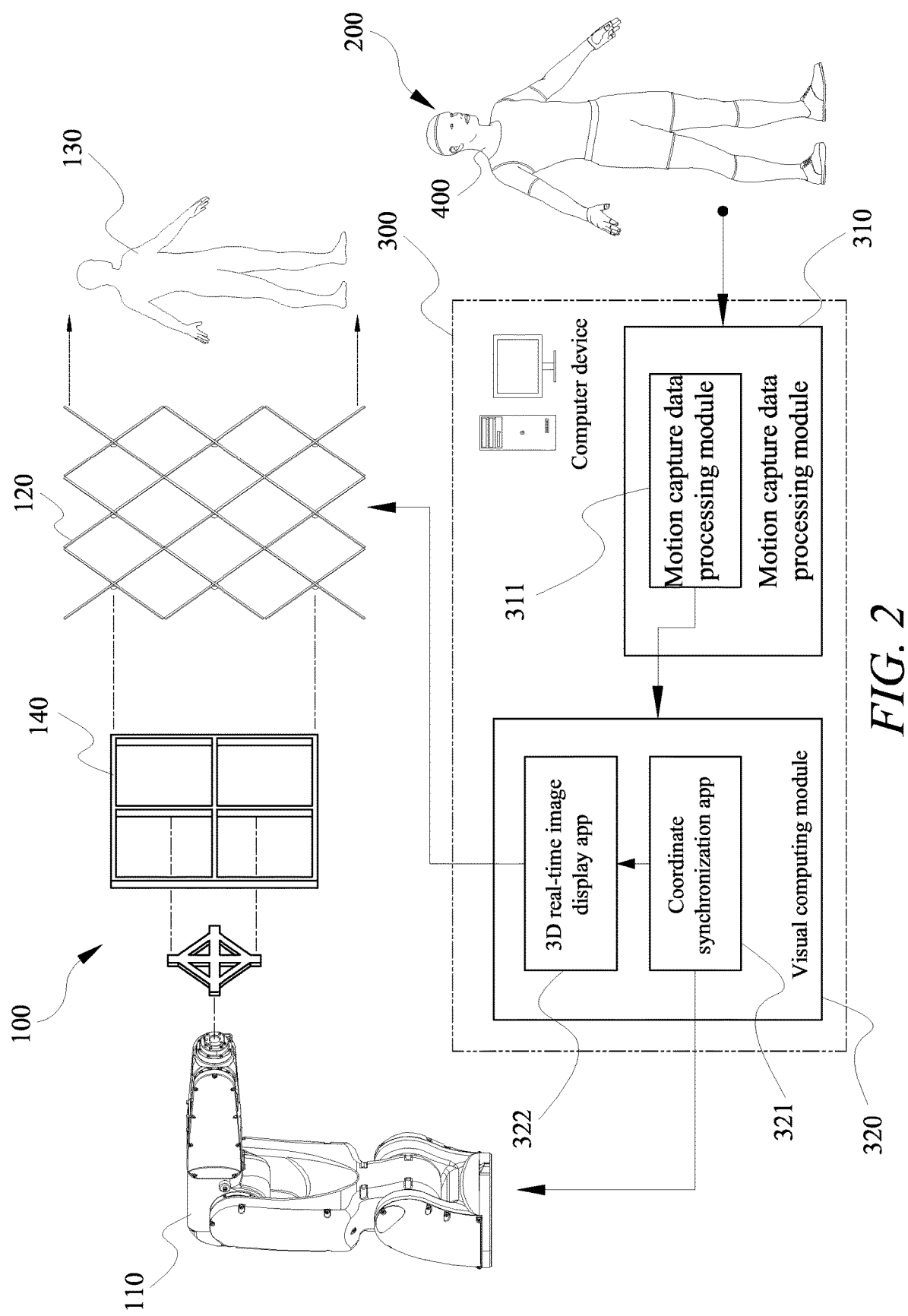
FIG. 2 is a schematic view for detailed construction of a real-time holographic reality display system.

Referring to FIG. 1, which illustrates a real-time holographic reality display system comprises a display unit 100, a motion capture device 200 and a computer device 300.

The display unit 100 is equipped with a robotic arm and a hologram LED fan display 120: the robotic arm is a six-axle robotic arm 110 with which the hologram LED fan display 120 is lifted for motions; the hologram LED fan display 120 shows images of a virtual character 130. The motion capture device 200 installed on a performer 400 is used in capturing real-time body motion coordinate data of the performer 400. The computer device 300 is used in receiving the real-time body motion coordinate data transmitted from the motion capture device 200 for calculations of a virtual character's skeleton coordinate data which are further divided into (a) position data to be transmitted to the six-axle robotic arm 110 and (b) motion data to be transmitted to the hologram LED fan display 120 on which the body motion of the performer 400 are displayed through the virtual character 130 immediately.

The display unit 100 is further equipped with a mounting bracket 140. The six-axle robotic arm 110 featuring the omni-directional degree of freedom is coupled with the mounting bracket 140 with which the hologram LED fan display 120 to be loaded is connected; moreover, the six-axle robotic arm 110 receiving coordinate data of the virtual character 130 from the computer device 300 is capable of moving synchronously to restore dynamic coordinates of the virtual character 130.

The hologram LED fan display 120 is a rotary LED device which receives and displays image data generated by the computer device 300. In the present embodiment, naked-eye holographic images are rendered by a fast-spinning cross acrylic bar on which 576 LEDs with the total length of 68.5 cm and the resolution of 576*576 pixels are mounted under 680 rpm for generation of ghost shadow.

The mounting bracket 140 is constructed based on a 141 (L)×141 (W) aluminum frame on which aluminum bars are mounted centrally for development of a projector bracket with tetragonal lattices. The mounting bracket 140 with the tetragonal lattices due to linking aluminum bars features nine junctions on which the hologram LED fan display 120 is fixed and positioned.

With terminals of the six-axle robotic arm 110 firmly connected to the back center of the projector bracket, the hologram LED fan display 120 is lifted by the six-axle robotic arm 110 for motions.

The motion capture device 200 is a wearable motion-capture bodysuit worn on the performer 400 from which the real-time body motion coordinate data of the performer 400 are collected for transmission to the computer device 300 and data processing.

The computer device 300 comprises a motion capture data processing module 310 and a visual computing module 320. The motion capture data processing module 310 is used in receiving the real-time body motion coordinate data from the wearable motion-capture bodysuit for calculation of skeleton coordinate data of a virtual character and transmission of the skeleton coordinate data to the visual computing module 320 from a communications app 311 and a router for subsequent processing.

The visual computing module 320 in which a coordinate synchronization app 321 and a 3D real-time image display app 322 are installed is used in receiving the real-time body motion coordinate data transmitted from the motion capture data processing module 310.

The skeleton coordinate data of the virtual character for the 3D real-time image display app 322 and the six-axle robotic arm 110 are synchronized through the coordinate synchronization app 321 and divided into two types of data as follows:
(a) Position Data: Position Data are aimed at motion trajectories of the hologram LED fan display 120 mounted on the six-axle robotic arm 110;
(b) Motion Data: Motion data is provided to a humanoid skeleton model in the 3D real-time image display app 322 for synchronous motions.

The 3D real-time image display app 322 developed with Unity3D is capable of immediately computing a humanoid skeleton animation rendered and displayed in more than 30 frames per second wherein the humanoid skeleton animation features dynamic data come from the motion capture data processing module 310 and humanoid model images completed with a 3D drawing tool and saved as the FBX format are transmitted to the hologram LED fan display 120.

The real-time holographic reality display system effectuated in the present disclosure comprises basic steps as follows:
1. The motion capture device 200 is worn on the performer 400 for capture of real-time motion data during performance;
2. Motion coordinate data are transmitted to the motion capture data processing module 310 and further the coordinate synchronization app 321 in the visual computing module 320 through the communications app 311;
3. The skeleton coordinate data of the virtual character are divided into position data and motion data by the coordinate synchronization app 321;
4. The position data are transmitted to the hologram LED fan display 120, which is driven and shifted by the connected six-axle robotic arm 110, such that spatial positions of the performer 400 are simulated by the virtual character 130;
5. The motion data are transmitted to the 3D real-time image display app 322 and applicable to humanoid model images which will be rendered in real-time body motions of the performer 400 and displayed on the hologram LED fan display 120.

The real-time holographic reality display system in the present disclosure renders both position data and motion data of a performer 400 performing at a backstage as a virtual character 130 performing on a stage immediately through the six-axle robotic arm 110 and the hologram LED fan display 120.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A real-time holographic reality display system, comprising:
a display unit equipped with a robotic arm and a hologram LED fan display wherein the robotic arm is capable of lifting the hologram LED fan display for motions and the hologram LED fan display shows images of a virtual character;
a motion capture device installed on a performer and used in capturing real-time body motion coordinate data of the performer;
a computer device used in receiving the real-time body motion coordinate data transmitted from the motion capture device for calculations of a virtual character's skeleton coordinate data that are further divided into (a) position data to be transmitted to the robotic arm and (b) motion data to be transmitted to the hologram LED fan display on which the body motions of the performer are displayed through the virtual character immediately.

2. The real-time holographic reality display system as claimed in claim 1 wherein the robotic arm is a six-axle robotic arm.

3. The real-time holographic reality display system as claimed in claim 1 wherein the hologram LED fan display is made of a fast-spinning cross acrylic bar on which a plurality of LEDs are mounted for generation of ghost shadow rendering naked-eye holographic images.

4. The real-time holographic reality display system as claimed in claim 1 wherein the display unit is further equipped with a mounting bracket on which the hologram LED fan display is fixed with terminals of the robotic arm firmly connected to the mounting bracket.

5. The real-time holographic reality display system as claimed in claim 1 wherein the motion capture device is a wearable motion-capture bodysuit worn on the performer.

6. The real-time holographic reality display system as claimed in claim 1 wherein the computer device comprises a motion capture data processing module and a visual computing module: the motion capture data processing module is used in receiving the real-time body motion coordinate data from the motion capture device for calculation of skeleton coordinate data of a virtual character and transmission of the skeleton coordinate data to the visual computing module from a communications app and a router.

7. The real-time holographic reality display system as claimed in claim 6 wherein the visual computing module comprises a coordinate synchronization app and a 3D real-time image display app: the coordinate synchronization app divides the skeleton coordinate data of the virtual character into (a) position data to be transmitted to the robotic arm which drives the hologram LED fan display for motions and (b) motion data to be transmitted to the 3D real-time image display app for display of images through the hologram LED fan display.

* * * * *